United States Patent [19]

Breckwoldt et al.

[11] Patent Number: 5,799,729
[45] Date of Patent: Sep. 1, 1998

[54] DEVICE FOR WORKING THE INSIDES OF PIPES, CONDUITS OR THE LIKE

[75] Inventors: Frederik Breckwoldt, Rheinstetten; Markus Lämmerhirt, Karlsruhe, both of Germany

[73] Assignee: D.T.I.Dr. Trippe Ingenieurgesellschaft mbH, Karlsruhe, Germany

[21] Appl. No.: 765,721
[22] PCT Filed: May 1, 1996
[86] PCT No.: PCT/DE96/00751
§ 371 Date: Feb. 28, 1997
§ 102(e) Date: Feb. 28, 1997
[87] PCT Pub. No.: WO96/35075
PCT Pub. Date: Nov. 7, 1996

[30] Foreign Application Priority Data

May 2, 1995 [DE] Germany ............... 195 15 927.6

[51] Int. Cl.$^6$ ............... E21B 29/00; B23C 3/00
[52] U.S. Cl. ............... 166/55; 175/77; 409/143
[58] Field of Search ............... 166/55, 55.6, 55.7, 166/55.8, 298; 175/77, 78; 409/143

[56] References Cited

U.S. PATENT DOCUMENTS

| | | | |
|---|---|---|---|
| 3,587,149 | 6/1971 | Brown | 166/55 |
| 4,648,454 | 3/1987 | Yarnell | 166/55.7 |
| 4,819,721 | 4/1989 | Long, Jr. | |
| 4,955,951 | 9/1990 | Nemoto et al. | 166/55.7 |
| 5,046,903 | 9/1991 | Nagayoshi et al. | 409/143 |
| 5,368,423 | 11/1994 | Hanna | 166/55.7 |
| 5,577,864 | 11/1996 | Wood et al. | 405/154 |
| 5,667,025 | 9/1997 | Haessly et al. | 175/78 |

FOREIGN PATENT DOCUMENTS

| | | |
|---|---|---|
| 0 331 081 A2 | 9/1989 | European Pat. Off. |
| 42 43 529 C2 | 7/1993 | Germany. |
| 43 11 365 A1 | 10/1993 | Germany. |

*Primary Examiner*—Hoang C. Dang
*Attorney, Agent, or Firm*—Panitch Schwarze Jacobs & Nadel, P.C.

[57] ABSTRACT

A device for working the interior of pipes, with an outer casing, an inner casing which is axially displaceable therein, with a rotary head which carries a bracket for attaching a working apparatus, with respective gearing arrangements each actuated by a motor, one for rotating the rotary head and another for the axial motion of the inner casing, with media-bearing ducts and control and energy supply leads introduced into the outer casing, has the following particulars: The gearing arrangement for the axial motion of the inner casing, the motor actuating this gearing arrangement, the gearing arrangement for executing the rotation of the rotary head, as well as the motor actuating this gearing arrangement, form four subassemblies which can be preassembled separately from one another. A fifth preassemblable subassembly has facilities for forming interfaces for the passage of lines from the inner casing to the rotary head. All subassemblies are accommodated in the inner casing and can be braced therein by mounting plates.

18 Claims, 1 Drawing Sheet

DEVICE FOR WORKING THE INSIDES OF PIPES, CONDUITS OR THE LIKE

BACKGROUND OF THE INVENTION

The invention concerns a device for working the interior of pipes, conduits or the like, which carries a working apparatus and has a controllable drive facility for the apparatus guidance.

Such a device which permits examining conduits for damage in an economical manner, and when needed, working on damage sites with various tools from the pipe interior is known from German patent 42 43 529. The conduit does not need to be exposed from the outside for this.

A compact construction is desirable for such a device, which makes possible the use of the device even with pipes of small diameter. Furthermore, from a technical perspective, a movement control for the device from outside the pipe is required, which permits complicated work procedures. However, there lies a difficulty in the fact that, in order to implement complicated sequences of movement, a considerable expenditure must be put forth for motive power of the working apparatus, which runs counter to the requirement for a compact construction.

The known device accomplishes the objective which imposes itself of constructing the device in a compact manner, but nonetheless in a manner suitable for implementing complicated sequences of movement for the working apparatus with a drive design which has the following particularities:

a) The drive facility has individual drives which are independent of each other, one of which as a linear drive makes possible the displacement of a work panel carrying the working apparatus longitudinally in the pipe, while another is constituted as a rotational drive for rotation of the work panel around the pipe axis or around an axis parallel to this, and a further one serves as a radial drive to move the work panel in a direction transverse to the pipe wall.

b) The device has an inner and an outer casing at least partially surrounding this.

c) Each individual drive includes its own gearing unit with a direct current motor actuating it, whereby the motors for linear and rotational drive are accommodated in the inner casing.

d) For executing the linear motion, the inner casing is longitudinally movable in relation to the outer casing.

This device, which belongs to the state of the art, was further developed from a conduit renewing device known from German Patent 43 11 365 in such a way that the inner casing is guided conducted in a sleeve bearing acting directly between the inner and outer casing when it is displaced relative to the outer housing.

SUMMARY OF THE INVENTION

Proceeding from this state of the art, underlying the invention is the objective of constructing such a device so that it has an especially assembly- and maintenance-friendly construction, and can be adapted in a simple manner to the particular conditions of various applications when changing equipment, while retaining the advantages of the known devices with regard to compact design and a drive design allowing complicated motions of the working apparatus.

The solution of this objective takes place by the device having the features presented in the claims.

Advantageous further configurations of the device of the invention are described in the subclaims.

A basic feature of the invention is the modular construction of the claimed device from preassemblable subassemblies. These can be easily interchanged, be it for maintenance or be it for adapting the device to altered application conditions. Basic components of the apparatus are arranged on plates adapted to the cross section of the inner casing. The various subassemblies need only be joined together one behind the other for assembly. After this, the inner casing can be slid over the assembled arrangement of subassemblies. A very simple and rapid assembly is possible owing to the skeleton-type construction with the mounting plates as "ribs."

The inner casing can be removed from the subassemblies for maintenance. After this, the entire internal mechanics and electronics of the apparatus are exposed. The subassemblies can be examined individually without it being necessary to disassemble the device any further. Should, however, one or another subassembly be exchanged, this is also possible with minimal assembly effort.

The construction concept of the invention makes it possible to construct the inner casing without through holes. It is thereby not susceptible to dirt and water.

Further advantages emerge from the features of the dependent claims.

The rotary head is also constructed independently of the other components as a preassemblable, interchangeable subassembly. It can be rotated about any desired angle on the basis of the special construction presented in the claims of the fifth subassembly, which has facilities for the formation of interfaces for the passage of leads from the inner casing to the rotary head. The media-bearing ducts can be introduced into the outer casing through a further preassemblable subassembly which is independent of the remaining assemblies, just like the control and energy provision leads, which can be constructed as a plate closing off the outer casing at its end facing away from the rotary head. This plate so partitions the various lines that they are nonreversibly connectable with an opposing plate, which is arranged on a supply cable which joins all lines together, especially through a plug connection.

For implementing the rotational motion of the rotary head, the corresponding gearing arrangement can be provided as a planetary gearing to be constructed especially compactly. A gearing arrangement with a threaded spindle and with a threaded sleeve serves expediently for implementing the outward and inward motion of the inner casing.

BRIEF DESCRIPTION OF THE DRAWINGS

The device of the invention is explained hereafter in greater detail on the basis of the drawing in the framework of an embodiment.

The single Figure depicts the device in longitudinal section in a highly simplified schematic representation.

DETAILED DESCRIPTION OF THE INVENTION

Figure 1:
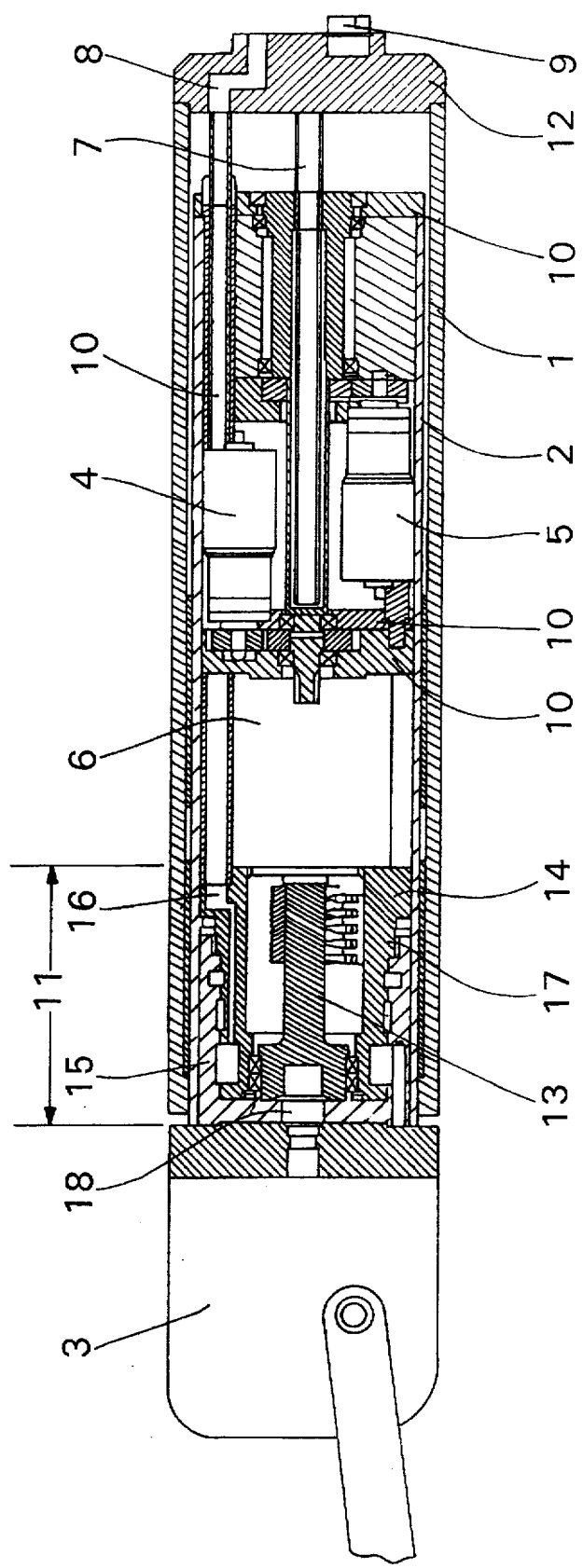

The outer casing is designated as 1 in which the inner casing 2 is axially displaceable. For this purpose, there is an arrangement comprising a threaded spindle 7 which operates together with a threaded nut (not specifically designated) and is actuated by an electric motor 5. This electric motor forms a preassemblable subassembly with a plate 10 which supports it and braces it against the inner casing wall, just like the gearing arrangement for the axial displacement of the inner casing 2 which is supported by a further plate 10.

Additional plates 10 each carry one gearing arrangement 6 for the rotation of the rotary head 3 (which is merely indicated) and an electric motor 4 actuating this gearing arrangement 6, and thus form further preassemblable subassemblies which are independent of the other subassemblies.

The four previously mentioned subassemblies are accommodated one after the other axially in the inner casing 2 and are radially braced against the inner casing 2 in each case by the plates 10. A fifth preassemblable subassembly 11 is joined to these four subassemblies at the front end of the inner casing 2. This has facilities for forming interfaces for the passage in particular of electrical, control and energy supply leads and media-bearing ducts from the inner casing 2 to the rotary head 3.

A shaft 13 connected to the outlet the gearing 6 for the rotation of the rotary head 3 belongs to this fifth subassembly 11, as does further a basically cylindrical stator 14 fixed in the inner casing and surrounding the shaft, and a basically pot-like rotor 15. The cylinder barrel of the rotor is accommodated in the annulus between the wall of the inner casing 2 and the stator 14. The rotor base is separably attached at the end of the shaft 13, so that the rotor 15 rotates along with the shaft 13.

The rotor base forms an attachment flange for the rotary head 3. This bears a panel (not shown) for attachment of a working device. The working device can be in particular be a polisher, milling cutter, smoother, gripper or other device, as for example a measuring or video device. Several devices of this type can also be attached together on the panel.

Necessary, especially electrical, control or energy supply leads, as well as media-bearing ducts for supplying the working device, of a drive motor mounted as desired in the area of the rotary head 3 for executing movement of the panel radially to the pipe to be worked or for other purposes, are passed through the fifth subassembly. This makes available compatible interfaces for the endlessly possible rotation of the rotary head 3. Media-bearing duct sections, only indicated in the drawing and designated with 16, are constructed in the stator 14 and in the rotor 15. These duct sections transition into corresponding duct sections formed in the rotary head. The hole pattern for the duct passages from the fifth subassembly 11 into the rotary head 3 is constructed to coincide in the base of the rotor 15 and on the rotary head. Suitable precautions are taken therefor, so that the duct passages are manufactured nonreversibly for connecting the rotor 15 with the rotary head 3.

Electrical control and energy supply leads are conveyed into the shaft 13 by means of a sliding ring 17 arranged between the shaft 13 and the stator 14, and terminate in a plug connection 18, which operates together with an opposing plug belonging to the rotary head 3. The plug connection is so constructed that the leads are nonreversibly connected with one another. The plug connection can be produced at the same time the rotary head 3 is put on the rotor base.

The rotary head 3 connected to the inner casing 2 in this manner can consequently be changed very simply. All lead connections are produced at the same time with the attachment of the rotary head 3, which forms a sixth preassemblable subassembly independent of the other subassemblies.

All media-bearing ducts 8 and all control and energy supply leads 9 are introduced into the outer casing 1 through a plate 12 in the embodiment shown. The plate 12 seals the outer casing 1 at its end facing away from the rotary head 3. It forms a further, seventh subassembly, which is preassemblable independently of the other subassemblies. This plate 12 partitions the various lines, so that they can be connected with an opening plate (not shown in the drawing), which is connected with a supply cable combining all lines. The coupling between plate 12 and opposing plate is only possible because the line passages are nonreversibly produced upon coupling.

The conveying of the lines from the plate 12 into the inner casing 2 and within it can take place by known means, for example with the aid of telescopic tubes compatible with the axial motion of the inner casing 2.

The motors can be electric motors, especially direct current motors.

We claim:

1. A device for working the interior of pipes, conduits or the like, which can be moved along the pipe in the pipe interior, comprising a tube-shaped outer casing (1), which can be fixed at certain places in the pipe to be worked relative to its wall, a tube-shaped inner casing (2) accommodated in the outer casing (1), which is axially displaceable relative to the outer casing (1) and can thereby be moved in and out of the outer casing, a rotary head (3) carried by the inner casing (2) arranged on its end which can be moved out, and which can be rotated relative to the inner casing (2) about its longitudinal axis, a panel for attachment of a working apparatus carried by the rotary head (3), a drive for moving the panel in a direction radially to the pipe to be worked, which can be activated by means of a motor, operating between the panel on the one hand and the rotary head (3) on the other, at least one gearing arrangement (6, 7) each acted upon by one motor (4, 5) for executing a rotational movement of the rotary head (3) on one hand, and the out and in movement of the inner casing (2) on another hand, media-bearing ducts (8) for supplying the working apparatus, introduced into the outer casing (1) and continuing in the interior of the inner casing (2) and up to the region of the panel, and control and energy supply leads for the motors as well as for the working apparatus, wherein a) a first gearing arrangement (7) for implementing the out and in movement of the inner casing (2), the motor actuating said first gearing arrangement, a second gearing arrangement (6) for executing the rotational movement of the rotary head (3), as well as the motor (4) actuating said second gearing arrangement, form four preassemblable subassemblies separately from each other, b) at least one of said assemblies is carried respectively by a plate (10) adapted to the cross section of the inner casing (2), and c) said four subassemblies are accommodated in the inner casing (2), and therein the subassemblies carried by the plates (10) are braced radially against the casing wall by these plates (10).

2. The device according to claim 1, further comprising:

d) a fifth preassemblable subassembly, independent of the other four subassemblies, which has facilities for formation of interfaces for the passage of control and energy supply leads and of media-bearing ducts from the inner casing (2) to the rotary head (3) and is accommodated in the inner casing area between the four subassemblies mentioned which follow axially upon one another on one hand, and the rotary head (3) on another hand.

3. The device according to claim 1, wherein the rotary head (3) forms a sixth preassemblable subassembly independently of the other four subassemblies.

4. The device according to claim 2, wherein the fifth subassembly which forms interfaces for lead passages from the inner casing area to the rotary head (3) has a construction which permits the rotation of the rotary head in relation to the inner casing (2) about an unlimited angle of rotation while maintaining the lead passages.

5. The device according to claim 1, wherein the media-bearing ducts and the control and energy supply leads are introduced into the outer casing (1) through a plate (12) forming a seventh preassemblable subassembly independently of the other subassemblies, wherein this plate (12) seals the outer casing (1) at its end facing away from the rotary head (3).

6. The device according to claim 5, wherein the plate (12) forming the seventh subassembly so partitions the various leads that they can be coupled with an opposing plate arranged with a supply cable which combines all the leads and which is nonreversible with respect to the lead passages.

7. The device according to claim 6, wherein the coupling between plate (12) and opposing plate takes place by means of a plug connection.

8. The device according to claim 1, wherein the second gearing arrangement (6) for executing the rotational movement of the rotary head (3) includes a planetary gearing.

9. The device according to claim 1, wherein the first gearing arrangement for executing the out and in movement of the inner casing (2) includes a threaded spindle (7) operating together with a threaded sleeve.

10. The device according to claim 2, wherein a shaft (13) acted upon by the output of the second gearing arrangement executing the rotation of the rotary head (3) belongs to the fifth subassembly, as do furthermore a basically cylindrical stator (14) attached in the inner casing surrounding the shaft (13) and a basically pot-shaped rotor (15), wherein a rotor cylinder barrel is accommodated in an annulus between the inner casing wall and the stator (14), and a rotor base which is separably attached at the end of the shaft (13) forms an attachment flange for the rotary head (3).

11. The device according to claim 10, wherein ducts (16) are formed in the stator (14) and in the rotor (15) which form parts of the media-bearing ducts.

12. The device according to claim 10, wherein a sliding ring arrangement (17) is accommodated in the annulus between the shaft (13) and the stator (14) by which electrical control and energy supply leads are conducted.

13. The device according to claim 10, wherein the electrical control and energy supply leads are passed over conduit sections running in the shaft (13).

14. The device according to claim 13, wherein the conduit segments running in the shaft (13) terminate in a plug connection (18) protruding through the rotor base arranged in the region of the end of the shaft, which operates together with an opposing plug belonging to the rotary head (3).

15. The device according to claim 1, wherein the motors are electric motors.

16. The device according to claim 15, wherein the motors are direct current motors.

17. The device according to claim 1, wherein the working apparatus is selected from the group consisting of a polisher, a milling cutter, a smoother, a gripper, a measuring device, and a video device.

18. The device according to claim 1, wherein the media-bearing ducts supply at least one of driving, cooling and working means.

* * * * *